(No Model.)
J. W. BAILEY.
WATER FILTER.
No. 268,776.  Patented Dec. 12, 1882.
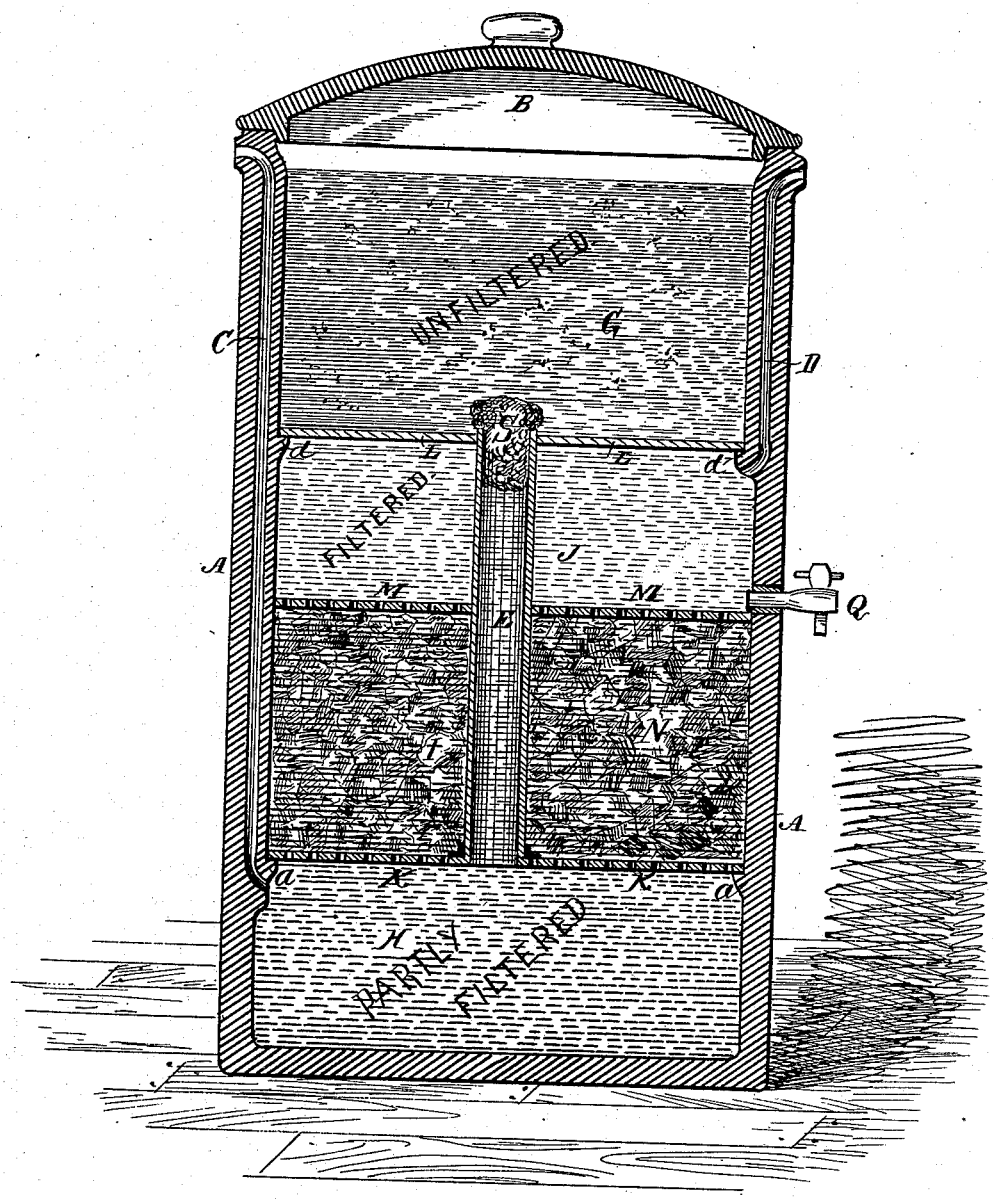

UNITED STATES PATENT OFFICE.

JOHN W. BAILEY, OF BOSTON, MASSACHUSETTS, ASSIGNOR TO HIMSELF AND ALMER C. TABER, OF SAME PLACE.

WATER-FILTER.

SPECIFICATION forming part of Letters Patent No. 268,776, dated December 12, 1882.

Application filed August 24, 1882. (No model.)

*To all whom it may concern:*

Be it known that I, JOHN W. BAILEY, of Boston, in the county of Suffolk, State of Massachusetts, have invented a certain new and useful Improvement in Water-Filters, of which the following is a description sufficiently full, clear, and exact to enable any person skilled in the art or science to which said invention appertains to make and use the same, reference being had to the accompanying drawing, forming a part of this specification, in which a vertical longitudinal section of the filter is shown.

My invention relates to that class of water-filters in which the water has a reverse flow, or is filtered and purified by passing upward through the filtering material; and it consists in a novel construction and arrangement of the parts, as hereinafter more fully set forth and claimed, by which a more effective and desirable article of this character is produced than is now in ordinary use.

The nature and operation of the improvement will be readily understood by all conversant with such matters from the following explanation, its extreme simplicity rendering an elaborate description unnecessary.

In the drawing, A represents the body or case of the filter; B, the cover; C D, the tube; E, the duct, and G H I J the respective compartments for unfiltered water, partially-filtered water, the filtering material, and the pure or filtered water.

The body and other parts of the filter are preferably composed entirely of earthen or pottery ware, although they may be of other materials, if desired.

Projecting from the inner wall of the body A there are a series of flanges or brackets, $a\ d$, and resting on the brackets $a$ there is a perforated disk or foraminous diaphragm, K, a tight or unperforated disk, L, being disposed on the upper brackets, $d$, which forms a bottom to the compartment or tank G. A vertical tube or duct, E, connects the disks L K at their centers, said duct passing through the center of a perforated disk, M, which rests on the top of the filtering material N in the chamber or compartment I. The filtering material may consist of animal charcoal, sand, &c., or any of the well-known ingredients or substances usually employed for such purposes. The duct E is provided at its upper end with the sponge S, and is cemented to or connected by water-tight joints with the disks L M K, these disks being also cemented to or connected by water-tight joints to the interior wall of the body A. In the use of my improvement the unfiltered water is placed in the tank or compartment G, whence it passes through the sponge S and duct E into the compartment H, from which it is forced upward through the disk K, filtering material N, and disk M into the compartment or tank J, from which it may be drawn through the faucet Q.

The object of the tube C is to clear the holes or perforations in the disk K, which may be accomplished, in case said holes become clogged or filled up, by blowing or forcing a current of air through said tube into the compartment H. In like manner the disk M may also be cleared by means of the tube D, the outer ends of the tubes being closed by any convenient means when not in use.

If desired, a filter constructed in this manner may be connected directly with the water-pipes or aqueduct-pipes by means of proper fittings attached to the cover B or to the duct E, in which case the sponge may be used or omitted, as desired.

Having thus explained my invention, what I claim is—

1. The improved water-filter described, the same consisting of the body A, disks L M K, duct E, and tubes C D, constructed, combined, and arranged to operate substantially as specified.

2. The tubes C D, formed in the body of the filter, substantially as set forth.

JOHN W. BAILEY.

Witnesses:
C. A. SHAW,
G. H. MERRILL.